United States Patent
Wang

(10) Patent No.: US 7,294,990 B2
(45) Date of Patent: Nov. 13, 2007

(54) BATTERY CHARGING DEVICE AND METHOD THEREOF

(75) Inventor: Chia Hua Wang, Taipei (TW)

(73) Assignee: HIPRO Electronic Co., Ltd., Taipei Hsien (TW)

( * ) Notice: Subject to any disclaimer, the term of this patent is extended or adjusted under 35 U.S.C. 154(b) by 331 days.

(21) Appl. No.: 10/914,156

(22) Filed: Aug. 10, 2004

(65) Prior Publication Data

US 2006/0033472 A1    Feb. 16, 2006

(51) Int. Cl.
*H01M 10/44* (2006.01)
*H01M 10/46* (2006.01)

(52) U.S. Cl. ..................................... 320/128

(58) Field of Classification Search ............... 320/128, 320/140, 141
See application file for complete search history.

(56) References Cited

U.S. PATENT DOCUMENTS

2003/0090237 A1 *    5/2003    Shenai et al.

* cited by examiner

*Primary Examiner*—Edward H Tso
(74) *Attorney, Agent, or Firm*—Bacon & Thomas, PLLC

(57) ABSTRACT

A battery charging device suitable for a portable electronic device includes a rechargeable battery, a controlling chip, an adjusting transistor, a feedback circuit and a charger with adjustable output. The charger has an external alternating-current power source and provides a changeable voltage to the rechargeable battery of the portable electronic device. The feedback circuit captures a signal of electric quantities of the rechargeable battery and feeds back to the charger to adjust its output voltage and then the charger is controlled to charge the rechargeable battery. The adjustable transistor is used to control the charging of the rechargeable battery to reduce the number of parts of the battery charging device and waste of circuit traces.

19 Claims, 3 Drawing Sheets

BATTERY CHARGING DEVICE AND METHOD THEREOF

BACKGROUND OF THE INVENTION

1. Field of the Invention

The present invention relates to a battery charging device, and more specifically, to a battery charging device, which controls a charger to charge a battery as the voltage of the battery changes.

2. Description of the Related Art

By the progress of electronic technology and widespread of electronic communication devices, portable electronic devices, such as notebook computer, PDA(Personal Digital Assistant) and digital cameras, etc., are commonly used. For easy to carry, these electronic devices are developed to become light, thin, short and small. Besides, lightweight and portable, easy to carry, and long time power supply are the requirements for users to choose which to buy. Because the power consumption of the portable electronic devices is pretty high, the battery needs to be charged so as to achieve a long time power supply. Recently, lithium-ion batteries are commonly used. Although light weight and large capacity, lithium-ion batteries do not have a memorizing characteristic. Lithium-ion batteries are continuously charged with a constant voltage.

Please refer to FIG. 4, showing a block diagram of a battery charging device of a conventional portable electronic device. The conventional charging device comprises a portable electronic device. The portable electronic device has a battery 30, a charging unit (Charge IC) 31, a programmable chip 32, and a charger 4. The charger 4 has an external alternating-current power source.

Please keep on referring to FIG. 4. The charging unit 31 is a switching direct-current to direct-current buck unit to supply charging current to the battery 30. However, the programmable chip 32 records data and conditions required for charging the battery 30. The data and conditions are all pre-set. For example, how much voltage and current are needed to charge, which conditions should be met then the battery 30 can be charged, and which power source should be cut off after the battery 30 is full-charged, etc.

When detecting the battery 30 is needed to charge, the programmable chip 32 will send signals to notify the charging unit 31 to charge the battery 30. After that, the programmable chip 32 notifies the charging unit 31 to switch off the charging power source to stop charging.

Although the conventional battery charging device can use the method of detection and determination to control charging of the battery 30, the conventional charging unit 31 cannot work independently, and therefore has to cooperate with the programmable chip 32 to operate such that the constitution components thereof are limited. This kind of assembly needs more components and thus does not have economic effects. Because the voltages between the initial and final stages of charging the battery 30 significantly differ, and the output voltage of the existing external charger is constant and unchangeable, the waste of circuit traces increases to cause instability of the devices and shorten the life.

SUMMARY OF THE INVENTION

The objective of the present invention is to provide a battery charging device, which captures signals of electric quantities of a battery by a feedback circuit and feedbacks to a charger to control the charger charging the battery.

The battery charging device for achieving above-mentioned objective comprises a rechargeable battery, a controlling chip, an adjusting transistor, a feedback circuit, and a charger with adjustable output. The controlling chip detects electric quantities of the rechargeable battery and feedbacks signals of the electric quantities by the feedback circuit to the charger with adjustable output to adjust its output voltage. The controlling chip controls the adjusting transistor to adjust the output voltage to charge the rechargeable battery.

The battery charging device is suitable for a portable electronic device.

The controlling chip is a programmable chip.

The adjusting transistor is a transistor or a field effect transistor.

The charger with adjustable output has an external alternating-current power source capable of modulating output voltage and output current of the charger.

The rechargeable battery, controlling chip, adjusting transistor, and feedback circuit can be packed to a battery packet type.

The output voltage is a little higher than a terminal voltage of the charging battery.

The charger with adjustable output responds to the signals of the electric quantities to modulate its output voltage.

Another objective of the present invention is to provide a charging method, which captures the signals of the electric quantities of a battery to feedback to a charger to control the charger charging the battery.

The charging method for achieving the above objectives comprises the following steps:

Using a controlling chip to detect the electric quantities of a rechargeable battery and determine whether the battery is needed to be charged;

Controlling a charger with adjustable output by the controlling chip through a feedback circuit; and Providing an adjusted output by the charger with adjustable output according to the signals of the feedback circuit as a charging source of the rechargeable battery.

The controlling chip controls an adjusting transistor to adjust the output voltage of the charger to charge the charging battery.

The controlling chip controls the charger with adjustable output through the feedback circuit to directly charge the rechargeable battery with a constant voltage.

The controlling chip controls the charger with adjustable output through the feedback circuit to directly charge the rechargeable battery with a constant current.

DETAILED DESCRIPTION OF THE INVENTION

Figure 1:
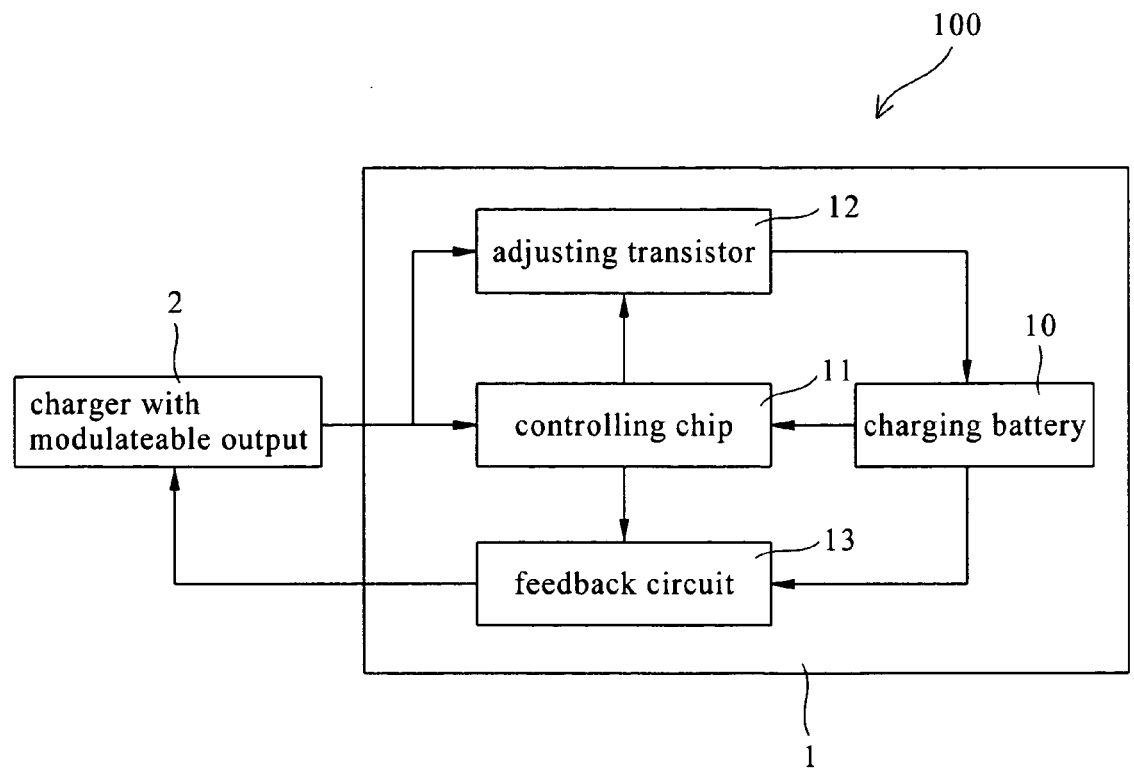
FIG. 1 is a block diagram of a battery charging device in accordance with one embodiment of the present invention.

Please refer to FIG. 1, showing a block diagram of a battery charging device in accordance with one embodiment of the present invention. The battery charging device 100 of the present invention comprises a rechargeable battery 10, a controlling chip 11, an adjusting transistor 12, a feedback circuit 13, and a charger with adjustable output 2, wherein the rechargeable battery 10, controlling chip 11, adjusting transistor 12, and feedback circuit 13 are embodied in a portable electronic device 1.

Please keep on referring to FIG. 1. The controlling chip 11 is a programmable chip. The controlling chip 11 is used to detect electric quantities of the rechargeable battery 10 and determine a status of the rechargeable battery 10. The feedback circuit 13 transmits signals of the electric quantities detected by the controlling chip 11 to the charger with adjustable output 2. The charger with adjustable output 2 has an external alternating-current power source, and the charger with adjustable output 2 provides an electric quantity to the rechargeable battery 10 of the portable electronic device 1. The charger with adjustable output 2 adjusts its output voltage according to the signals of the electric quantities transmitted by the feedback circuit 13 to charge the rechargeable battery 10. Besides, the adjusting transistor 12 is used to control the charger with adjustable output 2 to charge the rechargeable battery 10, or switching off the adjusting transistor 12 to stop charging the rechargeable battery 10.

The adjusting transistor 12 can be a transistor or a field effect transistor to control the charging voltage and current of the rechargeable battery 10.

To charge the rechargeable battery 10 of the portable electronic device 1, first the controlling chip 11 detects the electric quantities of the rechargeable battery 10 and determines whether the electric quantities of the rechargeable battery 10 are insufficient and needed to charge. The information of detection and determination is transferred to signals of electric quantities, and the feedback circuit 13 transmits the signals of the electric quantities to the charger with adjustable output 2. The charger with adjustable output 2 adjusts its output voltage according to the signals of the electric quantities, meanwhile the controlling chip 11 controls the adjusting transistor 12 to adjust the output voltage so that the output voltage of the charger with adjustable output 2 is a little higher than the terminal voltage of the rechargeable battery 10, i.e. about 0.3~1V. At this time, the adjusting transistor 12 is in a state of conductance to control the charger with adjustable output for charging the rechargeable battery 10. When the controlling chip 11 detects the electric quantities of the rechargeable battery 10 and determines the electric quantities of the rechargeable battery 10 is full-charged, the controlling chip 11 is used to control the adjusting transistor 12 in a state of un-conductance to stop the charger with adjustable output 2 from charging the rechargeable battery 10.

The preferred embodiment of the present invention is embodied in a portable electronic device 1. The rechargeable battery 10, controlling chip 11, adjusting transistor 12, and feedback circuit 13 can be packed to a battery packet type and then assembled into the portable electronic device 1, instead of building-in the portable electronic device 1 so that it can be mass-produced and suitable for any electronic devices.

Figure 2:
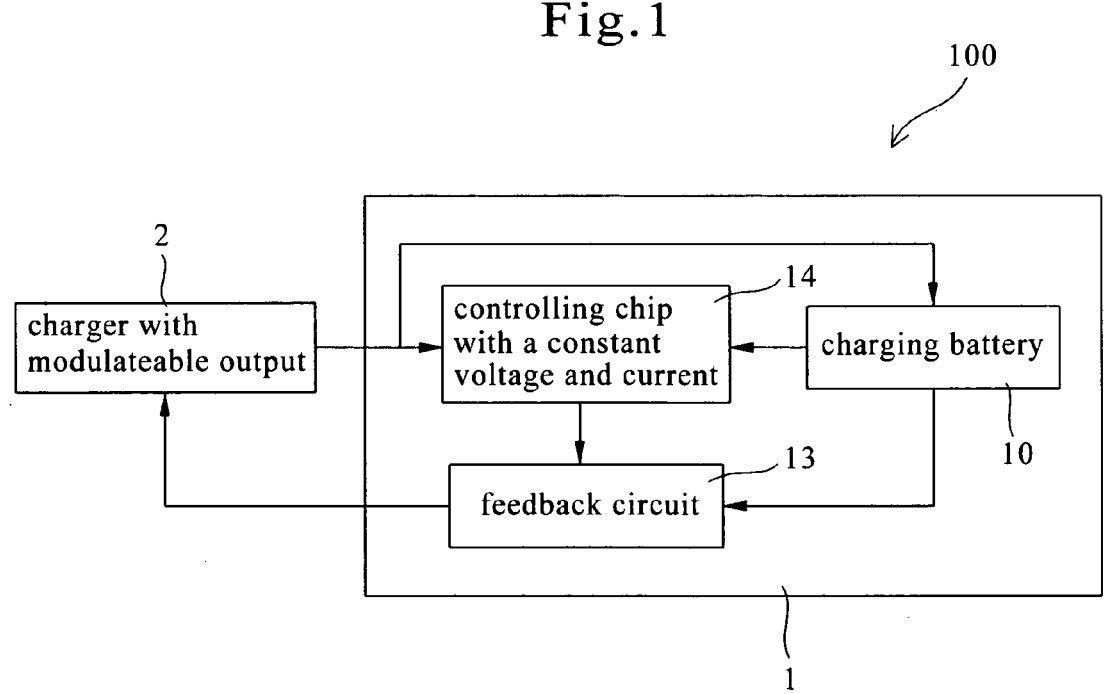
FIG. 2 is a block diagram of a battery charging device in accordance with another embodiment of the present invention.

Please refer to FIG. 2, showing a block diagram of the battery charging device of another embodiment of the present invention. The battery charging device 100 of the present invention comprises a rechargeable battery 10, a controlling chip 14 with a constant voltage and current, a feedback circuit 13, and a charger with adjustable output 2, wherein the rechargeable battery 10, controlling chip 14 with a constant voltage and current, and the feedback circuit 13 are embodied in a portable electronic device 1.

Please keep on referring to FIG. 2. The controlling chip 14 with a constant voltage and current is used to detect the electric quantities needed by the rechargeable battery 10 and determine the status of the rechargeable battery 10. The feedback circuit 13 converts the detected electric quantities and the status of the rechargeable battery 10 determined by the controlling chip 14 to signals that are transferred to the charger with adjustable output 2 by a signal transmission line. The charger with adjustable output 2 has an external alternating-current power source. The charger with adjustable output 2 provides an electric quantity to the rechargeable battery 10 of the portable electronic device 1. The charger with adjustable output 2 adjusts the output voltage according to the signals of the electric quantities received to directly charge the rechargeable battery 10 with a constant voltage or current.

To charge the rechargeable battery 10 of the portable electronic device 1, first the controlling chip 14 with a constant voltage and current is used to detect the electric quantities of the rechargeable battery 10 and determine whether the electric quantities of the rechargeable battery 10 are insufficient and needed to charge. The information of detection and determination is converted to signals, and the feedback circuit 13 is used to transmit the signals of the electric quantities to the charger with adjustable output 2. The charger with adjustable output 2 adjusts its output voltage according to the signals of the electric quantities received to directly charge the rechargeable battery 10 with a constant voltage or current. When the controlling chip 14 with a constant voltage and current detects the electric quantities of the rechargeable battery 10 is full-charged, the controlling chip 14 with a constant voltage and current controls the charger with adjustable output 2 to stop charging the rechargeable battery 10.

The preferred embodiment of the present invention is embodied in a portable electronic device 1. The rechargeable battery 10, controlling chip 14 with a constant voltage and current, and feedback circuit 13 can be packed to a battery packet type and then assembled into the portable electronic device 1, instead of building-in the portable electronic device 1 so that it can be mass-produced and suitable for any electronic devices.

Figure 3:
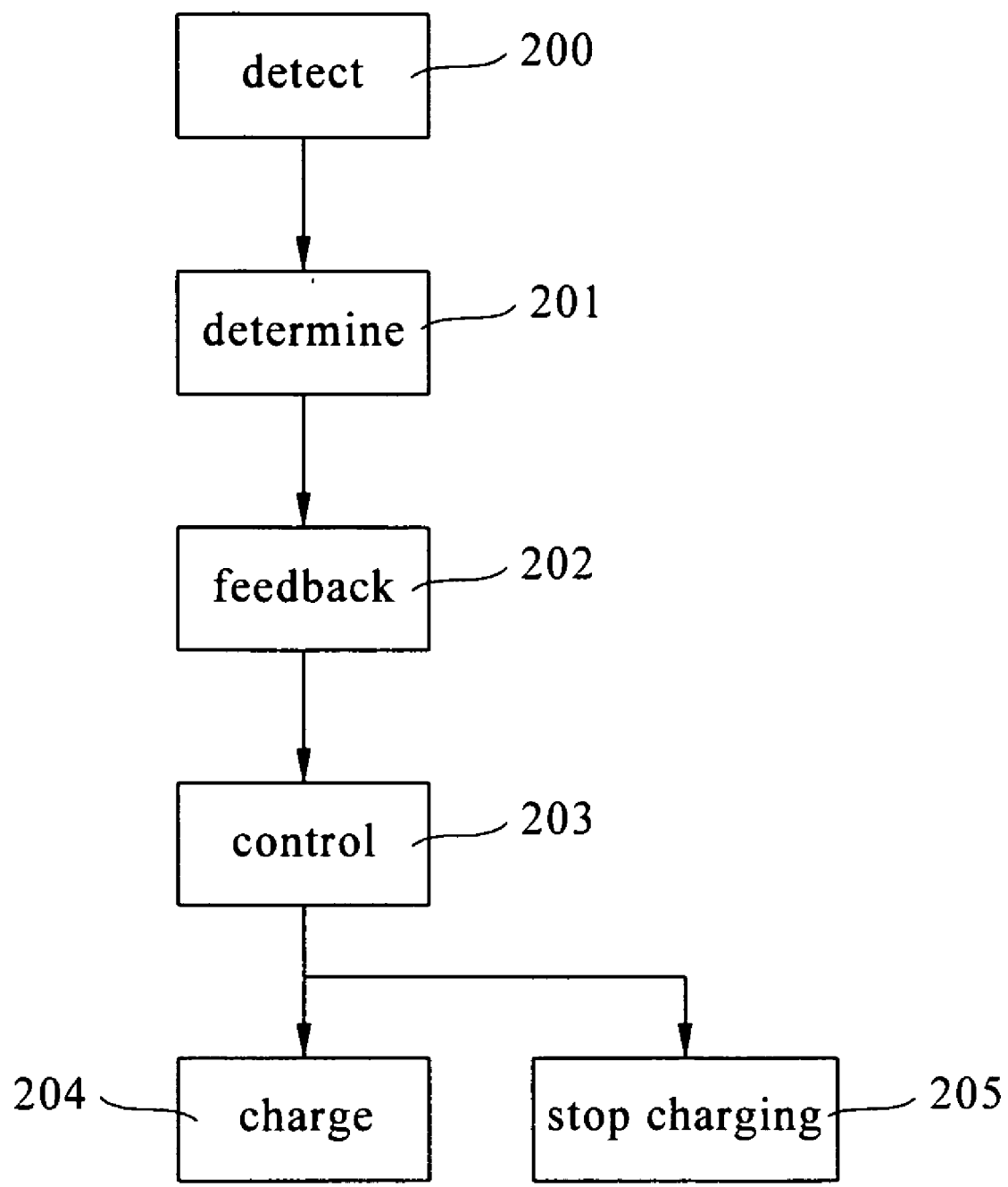
FIG. 3 is a flow chart of a charging method of the present invention.
Figure 4:
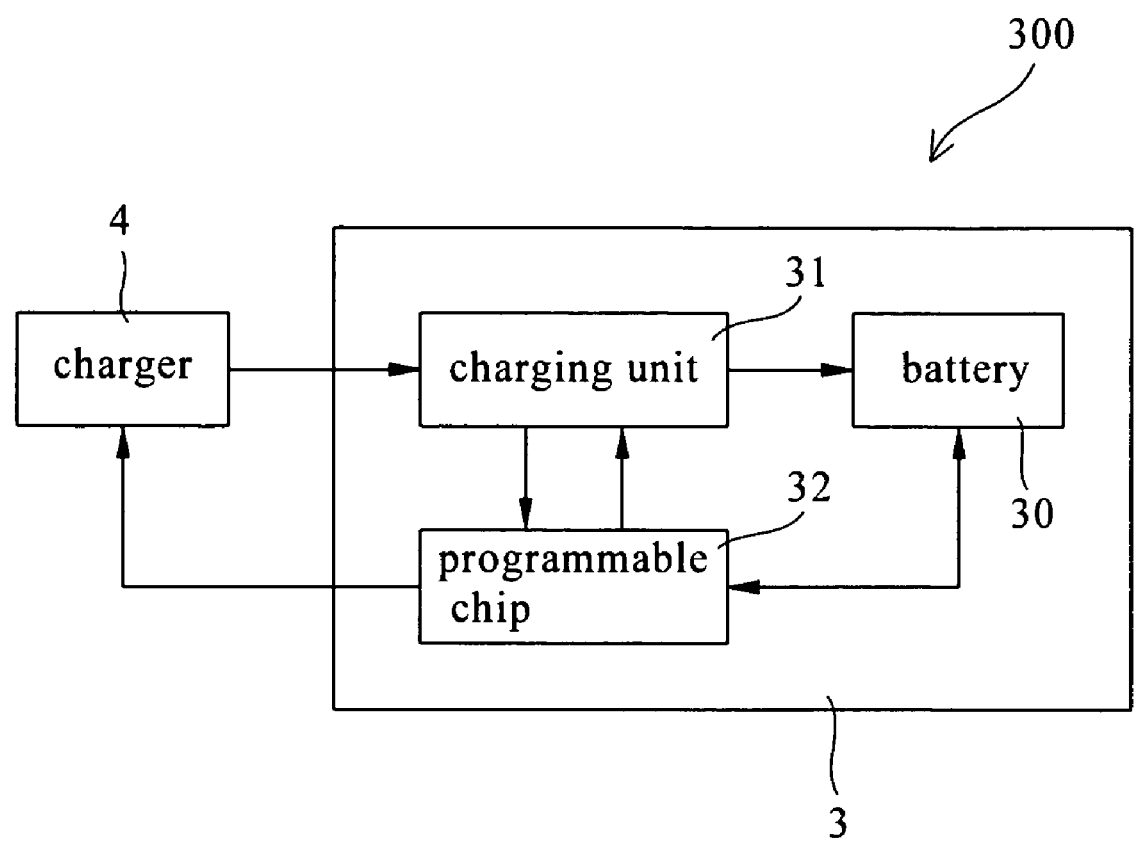
FIG. 4 is a block diagram of a conventional battery charging device.

Please refer to FIG. 3 accompanying with FIG. 1. FIG. 3 shows a flow chart of the charging method of the present invention. The charging method of the present invention comprises the following steps:

a. detecting 200:

The controlling chip 11 is used to detect the electric quantities of the rechargeable battery 10.

b. determining 201:

Meanwhile, the controlling chip 11 is used to determine whether the rechargeable battery 10 needs to be charged or is in a status of full-charged.

c. feedback 202:

The feedback circuit 13 is used to transmit the signals of the electric quantities of the rechargeable battery 10 detected by the controlling chip 11 to the charger with adjustable output 2.

d. controlling 203:

The charger with adjustable output 2 adjusts the output voltage according to the signals of the electric quantities received. Meanwhile the controlling chip 11 controls the adjusting transistor 12 to adjust the output voltage so that the output voltage of the charger with adjustable output 2 is a little higher than the terminal voltage of the rechargeable battery 10.

e. charging 204:

According to the received feedback signals, the output voltage of the charger with adjustable output 2 is adjusted to charge the rechargeable battery 10.

f. stop charging 205:

According to the received feedback signals, the switch transistor 12 is switched off to stop charging the rechargeable battery 10.

In this embodiment, the controlling chip 11 controls the charger with adjustable output 2 through the feedback circuit 13 to directly charge the rechargeable battery 10 with a constant voltage or current.

These embodiments are only used to illustrate the present invention, and are not intended to limit the scope thereof. Many modifications of the embodiments can be made without departing from the spirit of the present invention.

The invention claimed is:

1. A battery charging device, comprising a rechargeable battery, a controlling chip, an adjusting transistor, a feedback circuit and a charger with adjustable output, said controlling chip detects electric quantities of said rechargeable battery and feeds back signals of the electric quantities to said charger with adjustable output by said feedback circuit to adjust an output voltage of said charger with adjustable output, and said controlling chip controls said adjusting transistor to adjust the output voltage to charge said rechargeable battery.

2. The battery charging device of claim 1, wherein said battery charging device is applied in a portable electronic product.

3. The battery charging device of claim 1, said controlling chip is a programmable chip.

4. The battery charging device of claim 1, wherein said adjusting transistor is one of a transistor and a field effect transistor.

5. The battery charging device of claim 1, wherein said charger with adjustable output has an external alternating-current power source capable of modulating output voltage and output current of said charger.

6. The battery charging device of claim 1, wherein said rechargeable battery, controlling chip, adjusting transistor, and feedback circuit are packed in a battery package.

7. The battery charging device of claim 1, wherein the output voltage is a little higher than a terminal voltage of said rechargeable battery.

8. The battery charging device of claim 1, wherein said charger with adjustable output responds to the signals of the electric quantities to modulate its output voltage.

9. A battery charging device, comprising a rechargeable battery, a controlling chip, a feedback circuit and a charger with adjustable output, wherein said controlling chip detects electric quantities of said rechargeable battery and controls said charger with adjustable output by said feedback circuit, and said charger with adjustable output directly charges said rechargeable battery.

10. The battery charging device of claim 9, wherein said controlling chip controls said charger with adjustable output through said feedback circuit to directly charge said rechargeable battery with a constant voltage.

11. The battery charging device of claim 9, wherein said controlling chip controls said charger with adjustable output through said feedback circuit to directly charge said rechargeable battery with a constant current.

12. The battery charging device of claim 9, wherein said charger has an external alternating-current power source capable of modulating output voltage and output current of said charger.

13. The battery charging device of claim 9, wherein said charging battery, controlling chip, and feedback circuit are packed in a battery package.

14. The battery charging device of claim 9, wherein said battery charging device is suitable for a portable electronic product.

15. The battery charging device of claim 9, wherein said controlling chip with a constant voltage or constant current is a programmable chip.

16. A charging method comprising the steps of:
using a controlling chip to detect electric quantities of a rechargeable battery and thereby determining whether said rechargeable battery needs to be charged;
controlling a charger with adjustable output through a feedback circuit by said controlling chip; and
adjusting output of said charger with adjustable output according to signals of said feedback circuit as a charging source of said rechargeable battery.

17. The charging method of claim 16 comprising: said controlling chip controlling an adjusting transistor to adjust output voltage of said charger to charge said charging battery.

18. The charging method of claim 16 wherein said controlling chip controls said charger with adjustable output through said feedback circuit to directly charge said rechargeable battery with a constant voltage.

19. The charging method of claim 16 wherein said controlling chip controls said charger with adjustable output through said feedback circuit to directly charge said rechargeable battery with a constant current.

* * * * *